W. T. HARKEY.
FERTILIZER DISTRIBUTER.
APPLICATION FILED AUG. 14, 1908.
930,597.
Patented Aug. 10, 1909.
2 SHEETS—SHEET 1.
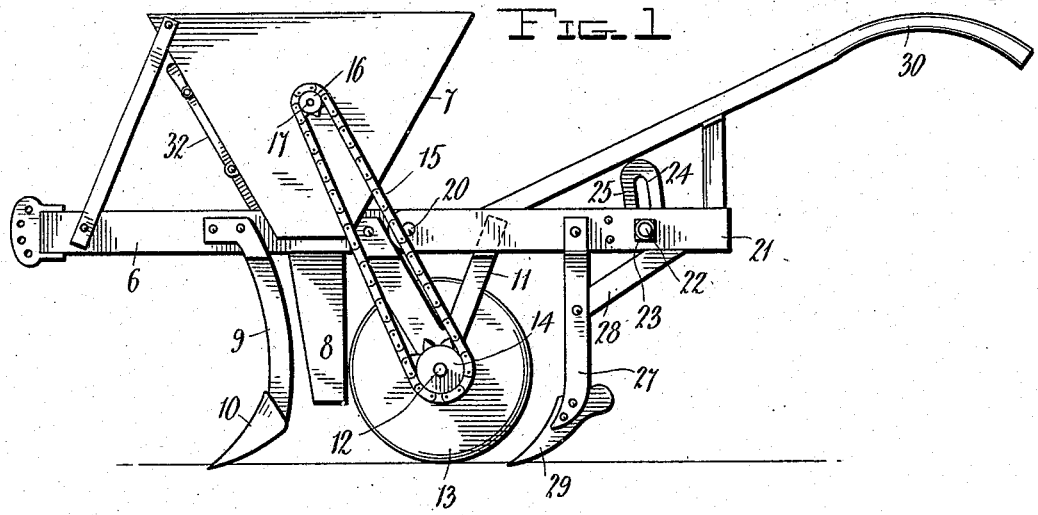
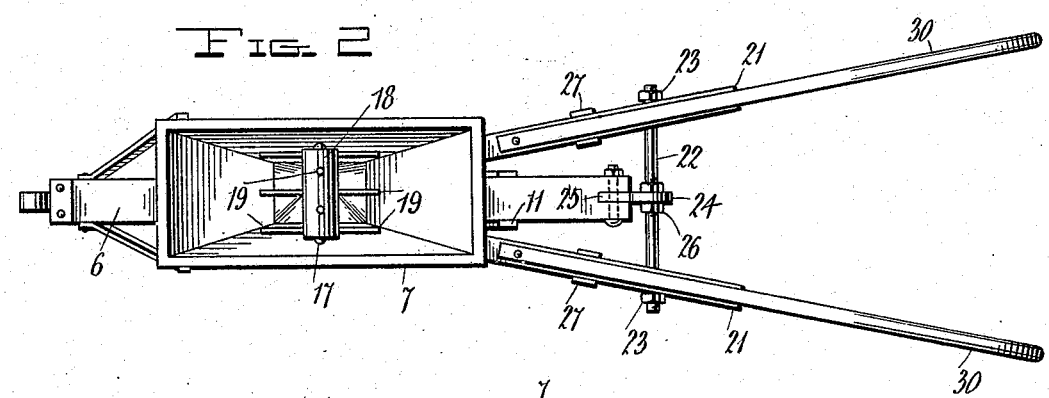
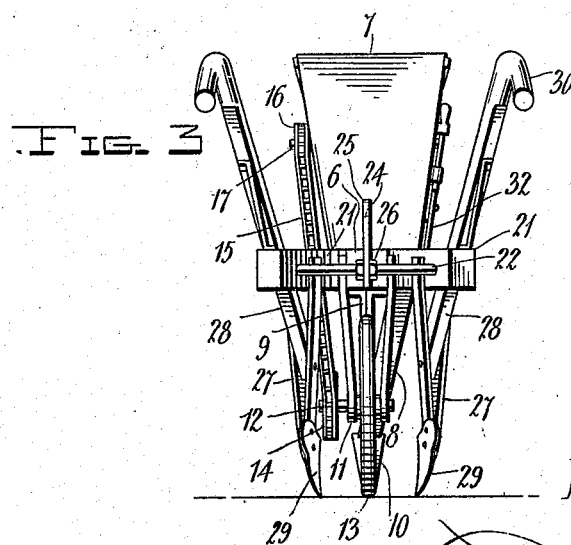
Inventor
Welton T. Harkey
Witnesses
Attorneys

W. T. HARKEY.
FERTILIZER DISTRIBUTER.
APPLICATION FILED AUG. 14, 1908.

930,597.

Patented Aug. 10, 1909.
2 SHEETS—SHEET 2.

Witnesses

Inventor
Welton T. Harkey

By
Attorneys

UNITED STATES PATENT OFFICE.

WELTON T. HARKEY, OF HARPERVILLE, MISSISSIPPI.

FERTILIZER-DISTRIBUTER.

No. 930,597.

Specification of Letters Patent.

Patented Aug. 10, 1909.

Application filed August 14, 1908. Serial No. 448,557.

*To all whom it may concern:*

Be it known that I, WELTON T. HARKEY, a citizen of the United States, residing at Harperville, in the county of Scott, State of Mississippi, have invented certain new and useful Improvements in Fertilizer-Distributers; and I do hereby declare the following to be a full, clear, and exact description of the invention, such as will enable others skilled in the art to which it appertains to make and use the same.

The invention relates to a fertilizer distributer and more particularly to an agricultural machine for opening a furrow, distributing fertilizer therein and subsequently closing the furrow.

The primary object of the invention is the provision of a fertilizer distributer comprising a furrow opener supported upon a main beam the latter having mounted thereon a fertilizer distributer having agitating means within the same and adapted to distribute fertilizer in the open furrow in rear of the furrow opener, adjustable furrow closers supported by the said beam and a wheel operating the agitator means within the fertilizer distributer and adapted to engage the ground upon the draft of the machine.

Another object of the invention is the provision of a fertilizer distributer having means for adjusting shovels forming furrow closers and for maintaining the same in their adjusted positions.

A further object of the invention is to simplify the construction of the fertilizer distributer and correspondingly reduce the cost of manufacturing the same so that it may be sold at a low price.

With these and other objects in view the invention for example consists in the construction, combination and arrangement of parts as will be hereinafter more fully described and as illustrated in the accompanying drawings which disclose the preferred form of embodiment of the invention. However, it is to be understood that changes, variations and modifications may be made such as come properly within the scope of the claim hereunto appended without departing from the spirit of the invention.

Figure 4:
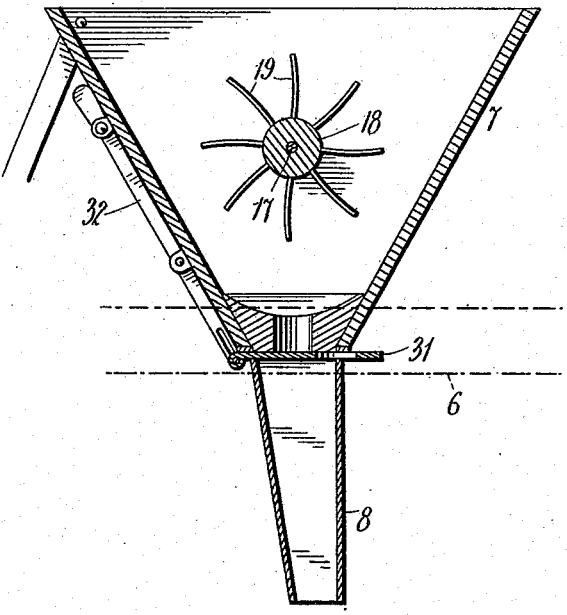
Figure 5:
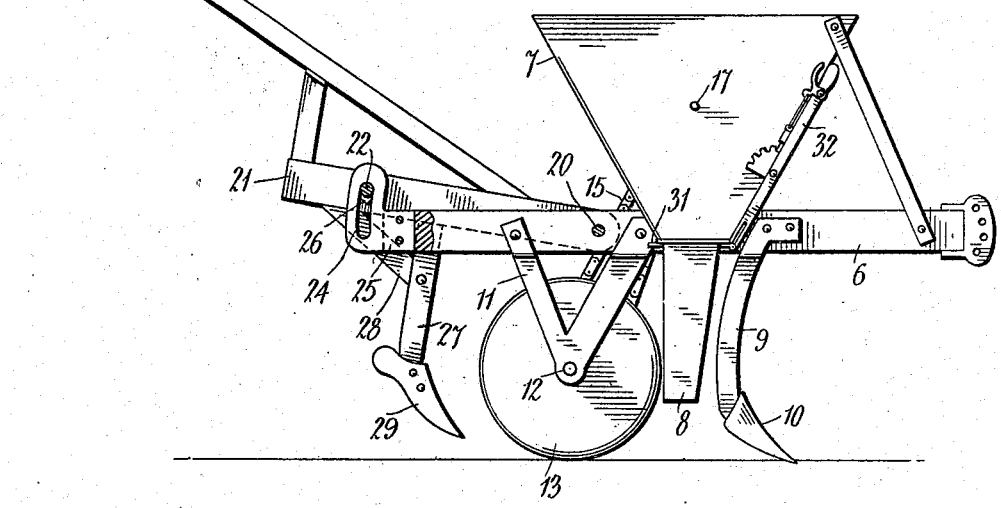

In the drawings: Figure 1 is a side view of the invention. Fig. 2 is a top plan view thereof. Fig. 3 is a rear end view. Fig. 4 is a detail longitudinal sectional view of the hopper and fertilizer distributing means. Fig. 5 is a side elevation partly in section to show the manner of adjusting the furrow closers.

Similar reference characters indicate corresponding parts throughout the several views in the drawings.

In the drawings, the machine comprises a main beam 6 having mounted thereon a hopper 7 for containing fertilizer and having the usual distributing spout 8. A distance in advance of the said spout 8 and secured to the main beam 6 is a standard 9 depending from the latter and having connected to its lower end a furrow opener or plow point 10 which is adapted to form an open furrow in the ground upon the advance movement of the machine. Secured to the said beam 6 in rear of the fertilizer hopper 7 and depending from the beam are bearing brackets 11 in which is journaled a shaft or axle 12 carrying a wheel 13 adapted to travel in the open furrow. Secured to said shaft 12 is a sprocket wheel 14 over which is trained a sprocket chain 15 the latter also trained over a sprocket wheel 16 mounted on the projecting end of a shaft 17 journaled centrally in the hopper 7 and which shaft carries a hub 18 provided with radially disposed curved agitator or stirring arms 19 working within the said hopper.

Connected to the beam 6 near the rear end thereof by a pivot 20 is a raising and lowering frame comprising outwardly diverging bars 21 the latter connected or united at their rear ends by a cross rod 22 carrying lock nuts 23 at opposite sides of the said bars 21 and which rod is vertically movable in a guide slot 24 contained in an L-shaped plate 25 mounted vertically in the rear end of the said main beam. On opposite sides of the L-shaped plate and in threaded engagement with the said rod 22 are lock nuts 26 whereby the said swinging frame can be locked in its vertically adjusted position.

Depending from each bar 21 is a plow standard 27 having fixed thereto and to the said bars brace rods 28 and upon the lower ends of the standard are fixed shovels forming furrow closers 29 which are adapted to close the open furrow and the same being disposed in rear and at opposite sides of the wheel carried by the main beam. Fixed to the bars 21 are upwardly inclined handle bars 30 for guiding the machine when in operation.

Within the bottom of the hopper is a slide valve 31 having a regulating arm 32 to be manually operated so as to increase or decrease the supply of fertilizer from the hopper to the spout leading therefrom.

What is claimed is—

A machine of the class described comprising a main beam, a fertilizer hopper having a distributer mounted therein, a furrow opener in advance of said distributer, a ground wheel, operating connections between the ground wheel and agitating means, a raising and lowering frame, a slotted L-shaped plate secured to the rear end of the main beam, a cross rod fixed to the frame, lock nuts on said rod and adapted to engage the plate to hold the same in its adjusted position and coverers carried by the raising and lowering frame.

In testimony whereof, I affix my signature, in presence of two witnesses.

WELTON T. HARKEY.

Witnesses:
BARNEY S. BISHOP,
R. M. ROSS.